(12) United States Patent
Franke et al.

(10) Patent No.: US 7,032,373 B2
(45) Date of Patent: Apr. 25, 2006

(54) DEVICE FOR COOLING COOLANT IN A GAS TURBINE AND GAS AND STEAM TURBINE WITH SAID DEVICE

(75) Inventors: Joachim Franke, Altdorf (DE); Erich Schmid, Marloffstein (DE)

(73) Assignee: Siemens Aktiengesellschaft, Munich (DE)

( * ) Notice: Subject to any disclaimer, the term of this patent is extended or adjusted under 35 U.S.C. 154(b) by 200 days.

(21) Appl. No.: 10/719,566

(22) Filed: Nov. 21, 2003

(65) Prior Publication Data

US 2004/0104017 A1 Jun. 3, 2004

(51) Int. Cl.
*F02C 7/12* (2006.01)
(52) U.S. Cl. ...................... 60/39.182; 60/806
(58) Field of Classification Search ............. 60/39.182, 60/785, 806
See application file for complete search history.

(56) References Cited

U.S. PATENT DOCUMENTS

| | | | |
|---|---|---|---|
| 4,767,259 A | * | 8/1988 | Kurosawa et al. ............. 60/806 |
| 5,491,971 A | | 2/1996 | Tomlinson et al. |
| 5,809,943 A | | 9/1998 | Olia |
| 6,363,710 B1 | * | 4/2002 | Gebke et al. ............. 60/39.182 |
| 6,412,285 B1 | * | 7/2002 | Ranasinghe et al. ..... 60/39.182 |
| 6,560,966 B1 | * | 5/2003 | Fetescu et al. ................ 60/806 |
| 6,892,523 B1 | * | 5/2005 | Fetescu et al. ................ 60/806 |

FOREIGN PATENT DOCUMENTS

| | | |
|---|---|---|
| DE | 44 46 862 A1 | 4/1996 |
| GB | 2 318 833 | 5/1998 |

* cited by examiner

Primary Examiner—Louis J. Casaregola

(57) ABSTRACT

The aim of the invention is a device for coolant cooling in a gas turbine which, with a relatively simple construction and low plant complexity permits a particularly high degree of efficiency in using the heat produced on cooling the coolant from a gas turbine. Said aim is achieved, whereby a number of interconnected evaporator tubes for a flow medium, are arranged in a coolant channel, connected to a gas turbine, to form forced throughflow steam generator. Said device is preferably used in a gas and steam unit with a waste heat steam generator on the exhaust gas side of a gas turbine, the heating surfaces of which are connected into the water-steam circuit of a steam turbine. The evaporator tubes of the device are thus connected on the inlet side by means of supply line to the feed water train of the water-steam circuit of the steam turbine.

10 Claims, 5 Drawing Sheets

DEVICE FOR COOLING COOLANT IN A GAS TURBINE AND GAS AND STEAM TURBINE WITH SAID DEVICE

CROSS REFERENCE TO RELATED APPLICATIONS

This application is a continuation of International Application No. PCT/EP02/05571, filed May 21, 2002 and claims the benefit thereof. The International Application claims the benefits of European application No. 01113305.5 EP, filed May 31, 2001, both applications are incorporated by reference herein in their entirety.

FIELD OF INVENTION

The present invention relates to a device for coolant cooling in a gas turbine. Furthermore, it relates to a gas and steam turbine with a waste heat steam generator on the exhaust gas side of a gas turbine, the heating surfaces of which are connected into the water-steam circuit of a steam turbine.

BACKGROUND OF INVENTION

A gas turbine, in particular in a gas and steam turbine, is usually used to generate electrical energy. To increase the performance of the gas turbine and thus to achieve the highest possible degree of efficiency, efforts are made to achieve a particularly high temperature of the working substance on the inlet side of the turbine of e.g. 1200° C. to 1500° C. However, such a high turbine inlet temperature may entail material problems, in particular in relation to the heat resistance of the turbine blades and vanes.

In order also to be able to operate reliably at such a raised turbine inlet temperature for a long service period, cooling of high-temperature turbine parts, such as, for example, rotating and/or guide blades, is usually provided in modern gas turbines. To this end, a coolant, for example, cooling air is applied to these turbine parts. In particular, a partial flow of the compressor air supplied by the compressor of the gas turbine can be enlisted as cooling air. In order to be able to enlist this partial flow of compressor air, the temperature of which may exceed 400° C. depending on the operating mode of the gas turbine, as coolant for the gas turbine this partial flow is usually cooled to temperatures of, for example, less than 200° C.

Such coolant cooling of a gas turbine usually takes place in a coolant cooler assigned to the gas turbine, in which cooling of the coolant takes place via heat exchange. The coolant cooler designed as a heat exchanger to this effect can be designed secondarily as a low-pressure steam generator in which a flow medium evaporates and the steam thus generated is fed into the water-steam circuit of a steam turbine or is also supplied to a district heating network to recover the energy. Generators known as water pipe steam generators or flue pipe steam generators which produce saturated steam are used for this purpose.

Precisely in the design of gas and steam turbines, a particularly standard design objective is the achievement of an especially high level of efficiency when converting the energy content of a fuel into electrical energy. With regard to this design objective, the results achieved to date for the transfer of heat produced during the cooling of the coolant of the gas turbine into the water-steam circuit of an assigned steam turbine have been only limited. To increase the level of efficiency attainable when using the heat produced during cooling of the coolant of the gas turbine, combined solutions with a two-stage coolant cooler were also taken into consideration in which both low-pressure and medium-pressure steam is generated during the cooling of the coolant. However, as has emerged, though slightly increased efficiency with regard to the use of heat produced during cooling of the coolant of the gas turbine is attainable in the case of such a solution, there is disproportionately high expenditure on plant technology.

SUMMARY OF INVENTION

The object of the invention is therefore to specify a device for coolant cooling of a gas turbine which makes possible particularly high efficiency with a relatively simple construction and low plant complexity when using heat produced during cooling of the coolant of the gas turbine. In addition, a gas and steam turbine of the aforementioned type should be specified in which on the one hand good gas turbine cooling is ensured, while on the other hand, high overall efficiency of the gas and steam turbine is attained by means of a particularly effective use of the heat gained in this way.

With regard to the device for coolant cooling of the gas turbine, this object is achieved in accordance with the invention by arranging a number of interconnected evaporator tubes for a flow medium in a coolant channel connected to the gas turbine to form a forced throughflow steam generator.

The invention is based on the consideration that high efficiency when using heat produced during cooling of the coolant of the gas turbine is attainable by means of the production of relatively high-quality steam during coolant cooling. In a departure from the concepts provided for use to date, in which relatively high-quality energy is converted from compressor air into relatively low-quality steam, the production of relatively high-quality steam, in other words, of steam at high pressure and a high temperature, is proposed. The steam supplied is particularly advantageous in thermodynamic terms and, to this effect, of particularly high-quality if it can be supplied not as saturated steam but as superheated steam. This is with relatively low plant complexity of the coolant cooler in a relatively wide parameter range of the operational parameters where the coolant cooler is designed in accordance with the so-called BENSON principle, in other words, as a forced throughflow steam generator. In a steam generator designed in this way, complete evaporation of the flow medium takes place in the evaporator tubes in a single operation. Precisely such a coolant cooler design permits a variable evaporation end point independent of operation in the series-connected evaporator tubes across a relatively wide range, where overheating of the steam occurs in the section downstream of the evaporation end point of the evaporator tubes.

For a relatively simple construction, advantageously compressor air from the gas turbine is provided as coolant for the gas turbine. Thus compressor air from the gas turbine can preferably be applied to the coolant channel, and in this case the device for coolant cooling of the gas turbine is a cooling air cooler.

Particularly stable operating performance with low susceptibility to failure by the device for coolant cooling or of the cooling air cooler is attainable if this is effected in an advantageous embodiment in what is known as a "horizontal construction". For this the coolant channel is advantageously designed for throughflow of the coolant for the gas turbine in an essentially horizontal direction with the longitudinal axis of the evaporator tubes essentially aligned in a vertical direction. In such a construction, relatively few pressure drops in the flow medium can be achieved, with in particular no lower limit for minimum throughflow in the evaporator tubes.

Such a design is therefore particularly reliable to operate particularly in light-load or start-up mode. In addition, in such a "horizontal construction", simple installation of the cooling air cooler is possible without an expensive support frame on relatively simple continuous footings, with good accessibility to the actual coolant channel ensured in addition. Maintenance and inspection work on a cooling air cooler designed in this way are kept particularly simple, while lateral extraction of the heating surfaces formed by the evaporator tubes is possible.

In order to ensure particularly good heat transmission from the coolant to be cooled to the flow medium secondarily flowing through the evaporator tubes and thus to ensure reliable cooling of the evaporator tubes in all operating states, these preferably each have internal finning. By means of such internal finning, a prewhirl is generated in the respective flow medium flowing through the evaporator tube. On account of this prewhirl, the flow medium is compressed against the internal wall of the respective evaporator tube particularly reliably as a result of the centrifugal force produced. The consequence is particularly good heat transmission from the internal wall of the evaporator tube to the flow medium conducted within the same.

Alternatively or in addition, the evaporator tubes have external finning as required. Such external finning entails, for example, a spiral metal band wound around the respective evaporator tube. This increases the surface of the evaporator tube exposed to the hot gas flow and thus makes an additional contribution to the heat yield of the same.

As complete evaporation of the flow medium with subsequent overheating takes place in the evaporator tubes, the cooling capacity of the coolant cooler is to a certain extent dependent on the throughflow rate of the flow medium. In order to enable adjustment of the cooling capacity of the device for coolant cooling to possibly varying operating states of the gas turbine, it is advantageously possible to adjust the flow medium to the evaporator tubes. It is preferably possible to apply the flow medium to the evaporator tubes via a supply line preceding them on the inlet side, with means to adjust the throughflow rate of the flow medium in the supply line. In particular, the means to adjust the throughflow rate of the flow medium preferably include a flow restrictor connected to the supply line.

In order to enable a particularly high degree of flexibility when cooling the coolant of the gas turbine, the cooling capacity is advantageously adjustable as a function of a temperature value of the coolant to be cooled and with regard to a desired temperature of the coolant. To this end, the means to adjust the throughflow rate of the flow medium are, in a particularly advantageous development, part of a control system in which the temperature of the coolant of the gas turbine serves as a reference variable and is compared with a desired value dependent on the operating point. The means to adjust the throughflow rate of the flow medium are advantageously assigned a control system which is connected on the inlet side to a temperature sensor assigned to the coolant channel. As a result of the flexibility achievable with such an arrangement when adjusting the cooling capacity to the actual operating status and the actual cooler requirements, such a coolant cooler can be used for a multitude of standard types of gas turbine.

With regard to the gas and steam turbine of the aforementioned type, the object is achieved by assigning a device of the type mentioned to the gas turbine where the evaporator tubes of the device are linked on the inlet side via a supply line to the feedwater train of the water-steam circuit of the steam turbine.

Precisely when used in a gas and steam turbine, the coolant cooler designed as a forced throughflow steam generator contributes the relatively high efficiency achievable when using the heat produced during cooling of the coolant of the gas turbine in a particularly advantageous manner to a destination usually specified in any case in the design of a gas and steam turbine. The feedwater train from which a partial flow for applying flow medium to the evaporator tubes of the coolant cooler is branched off, comprises in the usual version the partial area of the water-steam circuit of the steam turbine from the condenser to the evaporator heating surfaces. When said application to the evaporator tubes of the coolant cooler takes place from the feedwater train, condensate flowing from the condenser or also feedwater flowing to the heating surfaces can be provided.

The feedwater, which is usually under relatively high pressure as a result of a preceding feedwater pump, can be fed directly to the evaporator tubes of the coolant cooler. The pressure necessary for running through the evaporator tubes is supplied by the feedwater pump similarly to the heating surfaces connected to the actual water-steam circuit of the steam turbine. When using condensate for application to the evaporator tubes of the coolant cooler, the necessary pressure level for running through the evaporator tubes while avoiding the feedwater pump of the water-steam circuit of the steam turbine can also be generated via an independent compressor pump.

Depending on the type of construction of the gas and steam turbine, the water-steam circuit of the steam turbine may comprise several pressure levels, in particular two or three pressure levels. Precisely in such a multistage design of the water-steam circuit of the steam turbine, a particularly effective use of the heat produced during cooling of the coolant of the gas turbine is made possible by adjusting the coolant cooler for supplying relatively high-quality steam to the highest pressure level of the multistage water-steam circuit of the steam turbine. For this purpose, the evaporator tubes of the device for coolant cooling assigned to the gas turbine are advantageously connected on the outlet side to a high-pressure level of the water-steam circuit of the steam turbine. In the process, the steam generated in the coolant cooler can, for example, be fed into a high-pressure drum or in the event that the waste heat steam generator is also designed as a forced throughflow steam generator in the high-pressure range, into a high-pressure separator vessel.

As a rule, a preheater is connected to the feedwater train of the water-steam circuit of the steam turbine of a gas and steam turbine. This may be a condensate preheater also designated as an economizer and/or feedwater preheater. In a particularly advantageous further development, coolant cooling of the gas turbine that is variable and particularly flexibly adjustable to the respective operating situation can be achieved as flow medium may be applied to the evaporator tubes of the coolant cooler both with unpreheated and with preheated flow medium (that is to say, feedwater or condensate), in which the mixture ratio between preheated and unpreheated flow medium is adjustable as necessary. To this end, the supply line preceding the evaporating tubes of the coolant cooler on the inlet side is for its part advantageously connected on the inlet side via a first partial flow line to a first partial component of the feedwater train preceding the preheater and via second partial flow conduction to a second partial component of the feedwater train downstream of the preheater. In the process, feeding of the evaporator tubes of the coolant cooler with relatively cold flow medium can take place via the first partial flow line, whilst feeding of the evaporator tubes of the coolant cooler with preheated flow medium is made possible via the second partial flow line.

Advantageously, the mixture ratio of unpreheated and preheated flow medium is adjustable when feeding the evaporator tubes of the coolant cooler. To this end, the means to adjust the throughflow rate of the respective partial flow of flow medium are connected to the first and to the second partial flow line in a particularly advantageous embodiment. This is expediently assigned a control system via which the flow ratio of the partial flows into the partial flow lines is adjustable as a function of a characteristic value for a temperature value of the coolant to be cooled.

In particular, the main flow of the flow medium supplied to the evaporator tubes of the coolant cooler may consist of preheated feedwater supplied from the feedwater pump, whilst cold condensate is purposefully added to adjust the temperature of the incoming flow medium in the evaporator tubes of the coolant cooler.

The advantages achieved with the invention are in particular that through the embodiment of the coolant cooler as a steam generator for the flow medium in forced throughflow design, the provision of relatively high-quality steam in terms of thermodynamics is made possible during coolant cooling for the gas turbine. Precisely because of its construction as a forced throughflow steam generator, in addition in a relatively simple design, use of the coolant cooler in the supercritical or also in the subcritical pressure range is made possible so that reliable coolant cooling is also guaranteed in modern power plants with high design pressures or in the retrofitting of existing plants using relatively simple means. The coolant cooler is also particularly suited to what is known as solo operation in which no further use is made of the generated steam in an assigned steam turbine plant.

However, use of the high-quality steam generated in a corresponding pressure stage of the water-steam circuit of a steam turbine is particularly advantageous. Precisely the design as a forced throughflow steam generator makes possible reliable cover of a relatively wide range of operational parameters as a result of the variable evaporation end point. In particular, at temperatures of up to approximately 500° C. produced when using compressor air from the gas turbine as a coolant, when using heat-resisting materials such as, for example, high-temperature steels like 13 Cro Mo 44 or 15 Mo 3, a risk of overheating can be almost ruled out in all operating states. In particular, therefore, it is not necessary to feed the evaporator tubes with a minimum quantity of flow medium. Thereby, precisely in the case of the embodiment of the coolant cooler as a steam generator according to the forced throughflow principle, start-up or light-load operation with dry or partially filled evaporator heating surfaces is possible without the need for a relatively expensive separator vessel between individual pressure stages of the evaporator tubes.

The design of the coolant cooler as a forced throughflow steam generator therefore also makes it possible to influence the coolant temperature for the gas turbine immediately after start-up of the plant. As a result of the option of starting the coolant cooler with "dry" evaporator tubes, immediately after starting the gas turbine there are no substantial water masses to be heated in the coolant cooler, so that also when starting the gas turbine there is no risk of unintentionally intense cooling of the gas turbine cooling air which might in particular lead to cooling below the dewpoint of the water vapor incorporated in the cooling air with subsequent condensation.

BRIEF DESCRIPTION OF THE DRAWINGS

An embodiment of the invention is explained in more detail with reference to a drawing.

The same parts have the same reference characters in all the figures.

DETAILED DESCRIPTION OF INVENTION

Figure 1:
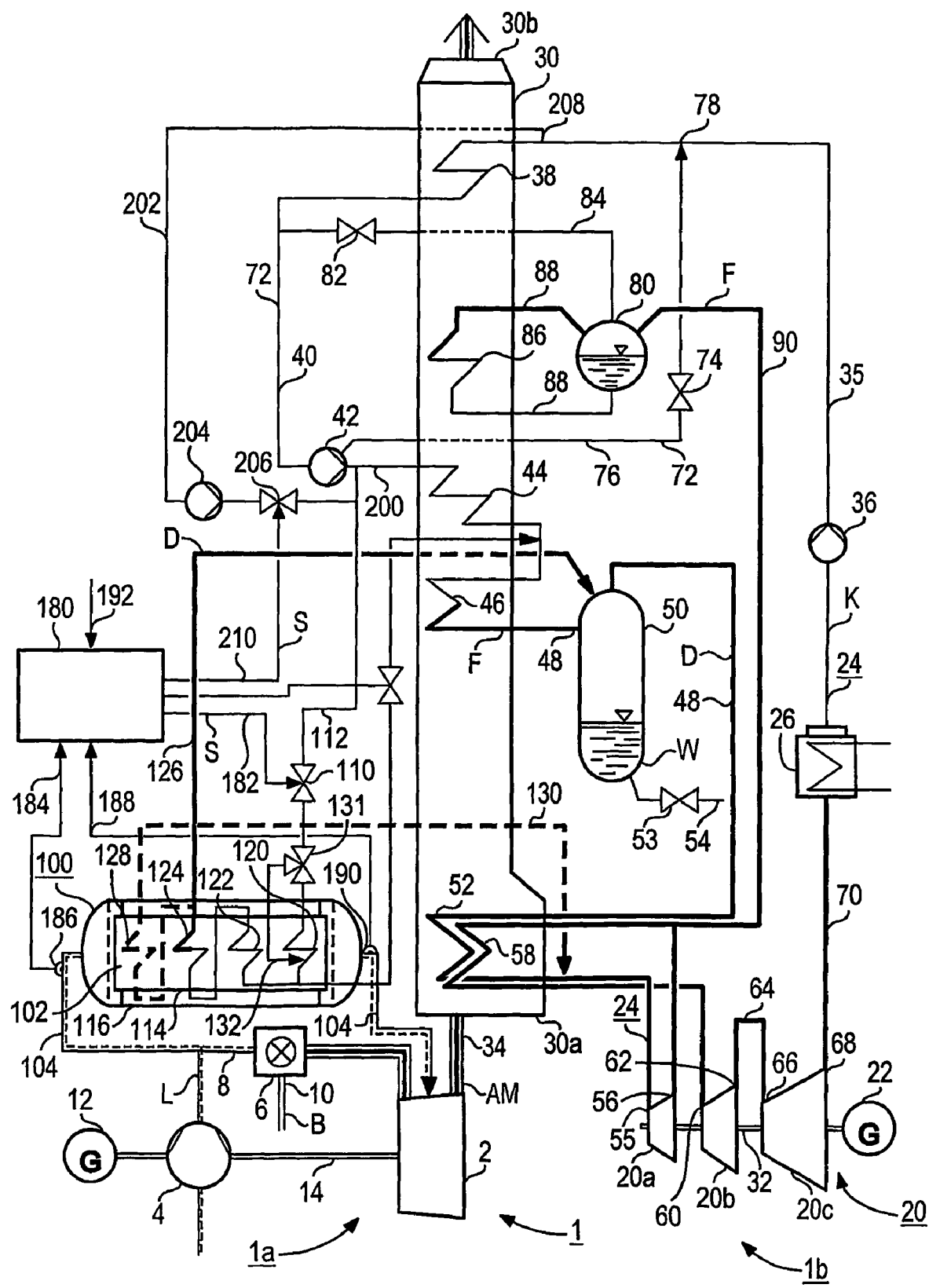
FIGS. 1–3 each show a diagrammatic view of a gas and steam turbine, the gas turbine of which is assigned a device for coolant cooling.
Figure 2:
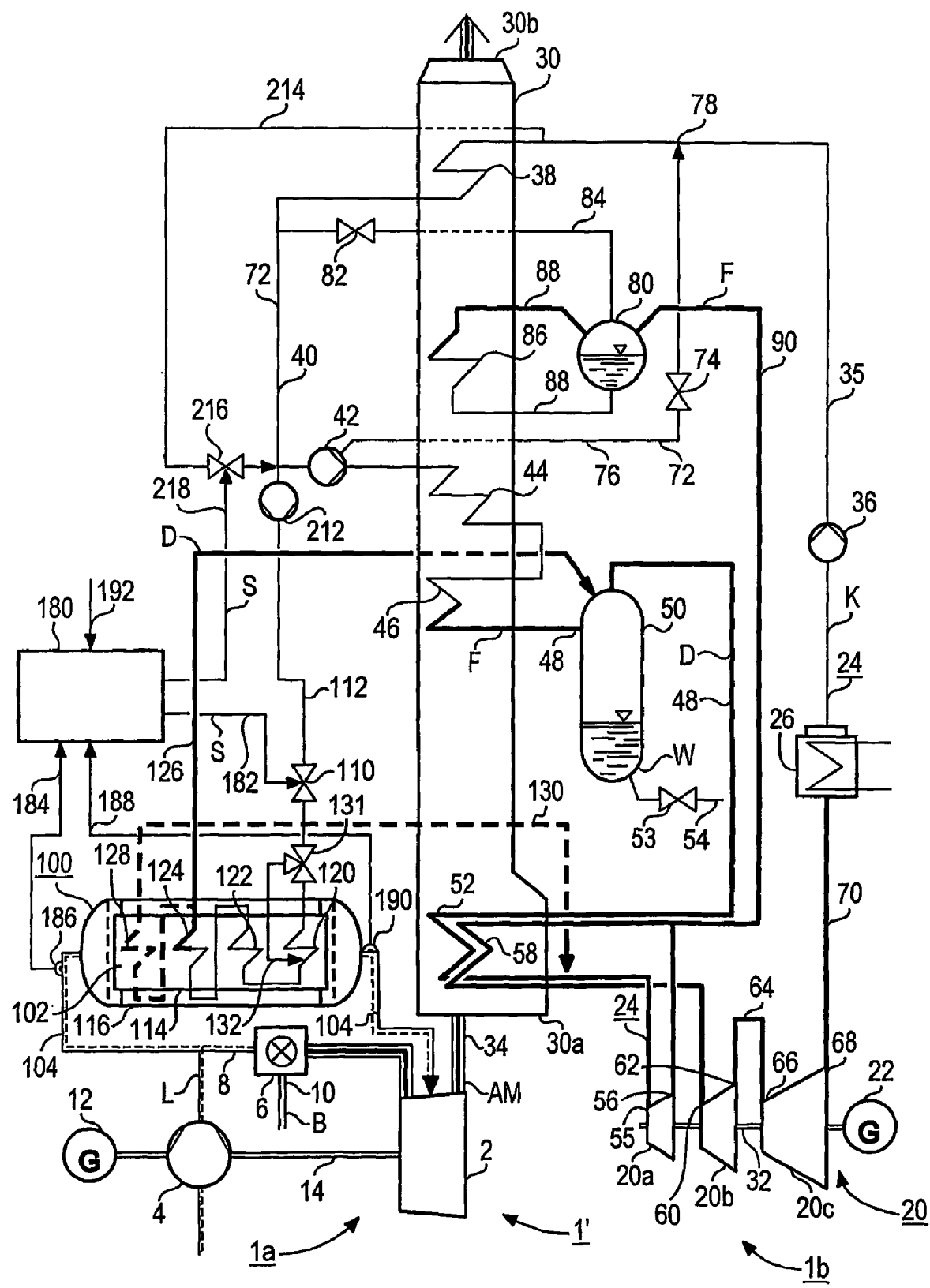
Figure 3:
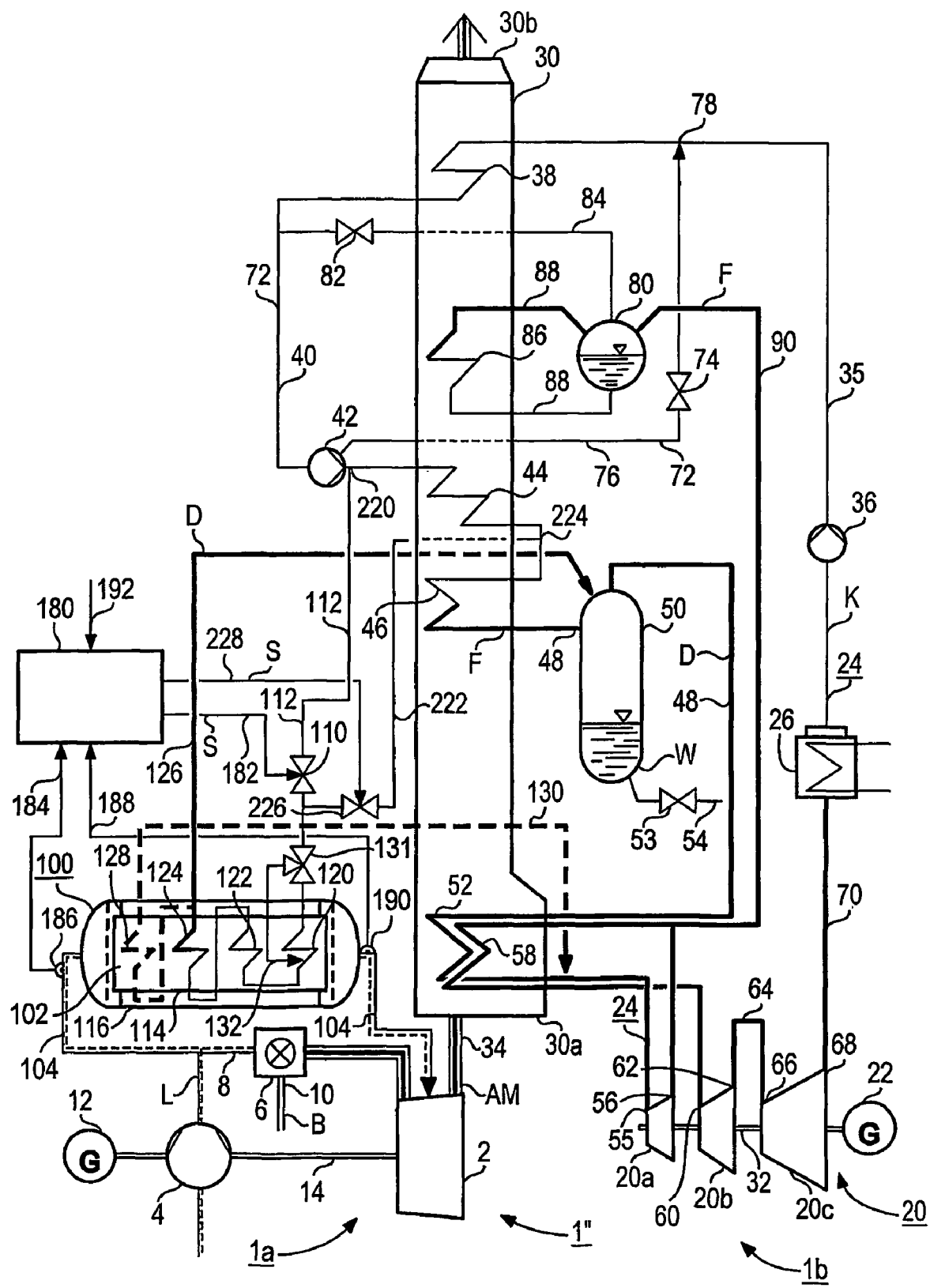

The gas and steam turbine 1, 1', 1" according to FIG. 1, FIG. 2 and FIG. 3 each comprises a gas turbine unit 1a and a steam turbine unit 1b. The gas turbine unit 1a comprises respectively a gas turbine 2 with connected air compressor 4 and a combustion chamber 6 preceding the gas turbine 2 which is connected to a fresh air pipe 8 belonging to the air compressor 4. A fuel line 10 flows into the combustion chamber 6 of the gas turbine 2. The gas turbine 2 and the air compressor 4 as well as a generator 12 are on a common shaft 14.

The steam turbine unit 1b comprises a steam turbine 20 with connected generator 22 and in a water-steam circuit 24, a condenser 26 downstream of the steam turbine 20 as well as a steam generator 30 intended as a waste heat steam generator for the gas and steam turbine 1. The steam turbine 20 consists of a first pressure stage or a high-pressure component 20a and a second pressure stage or a medium-pressure component 20b as well as a third pressure stage or a low-pressure component 20c, which drive the generator 22 via a common shaft 32.

To supply working substance AM expanded in the gas turbine 2 or flue gas in the steam generator 30, an exhaust gas line 34 is connected to an inlet 30a of the steam generator 30 designed as a waste heat steam generator. The expanded working substance AM from the gas turbine 2 leaves the steam generator 30 via its outlet 30b in the direction of an unspecified flue.

The condenser 26 downstream of the steam turbine 20 is connected via a condensate line 35, to which a condenser pump 36 is connected, with an economizer or condensate preheater 38 arranged in the steam generator 30. The condensate preheater 38 is connected on the outlet side via a supply line 40 to which is connected a feedwater pump 42 designed as a high-pressure pump, to a high-pressure preheater or feedwater preheater 44 arranged in the steam generator 30. Together with the condensate preheater 38, the supply line 40 and the feedwater preheater 44, the condensate line 35 therefore forms the feedwater train of steam turbine unit 1b.

The high-pressure component of the water-steam circuit 24 of the steam turbine unit 1b could be designed as a circulating evaporator with a high-pressure evaporator connected to a high-pressure drum on the inlet and outlet side to form a closed evaporator circuit. In the embodiment, however, the steam generator 30 is designed as a throughflow steam generator in its high-pressure range. To this end, the feedwater preheater 44 is connected on the outlet side to an evaporator 46 designed for throughflow operation. For its part, the evaporator 46 is connected on the outlet side via a steam line 48, to which a moisture separator 50 also designated as a separator vessel is connected, to a superheater 52. In other words, the water separator 50 is connected between the evaporator 46 and the superheater 52.

The moisture separator 50 can be fed with fresh steam F from the evaporator 46 via the steam line 48. In addition, a drain line 54 that can be shut off with a valve 53 for decanting of water W from the moisture separator 50 is connected to the moisture separator 50.

The superheater 52 is connected to the steam inlet 55 of the high-pressure component 20a of the steam turbine 20 on the outlet side. The steam outlet 56 of the high-pressure component 20a of the steam turbine 20 is connected via an intermediate superheater 58 arranged in the steam generator 30 to the steam inlet 60 of the medium-pressure component 20b of the steam turbine 20. Its steam outlet 62 is connected to the steam inlet 66 of the low-pressure component 20c of the steam turbine 20 via an overflow line 64. The steam outlet 68 of the low-pressure component 20c of the steam turbine 20 is connected to the condenser 26 via a steam line 70, resulting in the formation of a closed water-steam circuit 24.

The feedwater train of the gas and steam turbine 1, 1', 1" could still have a feedwater tank for degassing of the condensate as required and for temporary storage of the condensate required as feedwater at the appropriate place, that is to say, in particular in the flow direction of the condensate or feedwater before the feedwater pump 42. In the embodiment, however, the feedwater train is designed without a feedwater tank, while a circulation circuit 72 is provided for intermediate storage of condensate K as need be. To form this circulation circuit 72, a branch line 76 that can be shut off with a valve 74 is connected in a medium-pressure range to the feedwater pump 42 which empties into the condensate line 35 again at an infeed point 78 located before the condensate preheater 38. The circulation circuit 72 is therefore formed by the condensate preheater 38, the supply line 40 and the branch line 76.

In an additional pressure stage which is described in the embodiment as a medium-pressure stage, the steam generator 30 comprises a medium-pressure drum 80. For feeding with preheated condensate K, the medium-pressure drum 80 is connected via a branch line 84 that can be shut off with a valve 82 to supply line 40. Furthermore, the medium-pressure drum 80 is connected to a medium-pressure evaporator 86 arranged in the steam generator 30 to form a water-steam circuit 88. To dissipate fresh steam F, the medium-pressure drum 80 is connected via a steam line 90 to the intermediate superheater 58.

The water-steam circuit is arranged as a natural flow in the embodiment, in which the pressure gradients necessary for maintenance of the circuit are provided by the geodetic pressure difference. Alternatively, however, the water-steam circuit 88 can also be arranged as a forced flow, or the entire medium-pressure stage can also be designed as a forced-flow evaporator without the medium-pressure drum 80.

In the embodiment, the water-steam circuit 24 therefore comprises two pressure stages. Alternatively, however, the water-steam circuit 24 can also have another appropriate number of pressure stages, in particular, it can be designed in three stages. The gas and steam turbine 1, 1', 1" is designed for particularly high efficiency. To this end, among other things, for thermodynamic reasons, operation of the gas turbine 2 is intended at relatively high temperatures of, for example, 1200° C. or more of the working medium AM flowing from combustion chamber 6. In order to reliably avoid material problems at such a high turbine inlet temperature, in particular with regard to the heat resistance of the turbine blades and vanes of the gas turbine 2 in longer-term operation as well, gas turbine 2 is designed in such a way that at least its high-temperature components can be cooled. To this end, it is proposed that a partial flow of the compressor air L flowing from the air compressor 4 be fed into the gas turbine 2 as coolant while bypassing combustion chamber 6.

In order to ensure a reliable and adequate cooling effect from the partial flow envisaged as coolant or cooling air, cooling of this partial flow before its entry into gas turbine 2 is envisaged. To this end, gas turbine 2 is assigned a device 100 for coolant cooling or cooling air cooling, which cools the partial flow flowing from the air compressor 4 from a temperature of, for example, more than 400° C. before its entry into gas turbine 2 to a temperature level of approximately 200° C. The device 100 for coolant cooling of gas turbine 2 has a coolant channel 102 which is connected to a cooling air line 104 branching off from the fresh air pipe 8 of the air compressor 4 and flowing into gas turbine 2. The coolant channel 102 of the device 100 is therefore connected to the gas turbine 2 via the cooling air line 104.

For particularly high overall efficiency of the gas and steam turbine 1, 1', 1", for coolant cooling of the gas turbine 2, the device 100 is also designed for particularly effective use of the heat produced during cooling of the cooling air for gas turbine 2. In order to incorporate this heat into the water-steam circuit 24 of the steam turbine unit 1b to particular advantage, the device 100 for coolant cooling of the gas turbine 2 is designed as a heat exchanger to which the cooling air to be cooled for the gas turbine 2 can be applied primarily, and which secondarily has a number of interconnected evaporator tubes for a flow medium for the formation of a forced throughflow steam generator. Feedwater or condensate K from the water-steam-circuit 24 of the steam turbine unit 1b is proposed as the flow medium.

To supply this flow medium, a supply line 112 which can be shut off with a throttle valve or flow restrictor 110 is connected on the inlet side to the feedwater train of the water-steam circuit 24 of the steam turbine unit 1b. On the outlet side, the supply line 112 flows into a first evaporator heating surface 120 arranged in a flow channel 102 formed by an internal housing 114 which is for its part enclosed by a pressure vessel 116. The first evaporator heating surface 120 on the flow medium side is series-connected to a second evaporator heating surface 122 and a third evaporator heating surface 124, which for their part are likewise arranged in the coolant channel 102 of the device 100. The evaporator heating surfaces 120, 122, 124 are designed as forced throughflow evaporator heating surfaces so that the flow medium evaporates completely on crossover through the series-connected evaporator heating surfaces 120, 122 and 124. The evaporation end point is variable on account of the forced-flow evaporator principle, while in the heating surface area after the evaporation end point overheating of the steam generated occurs. For advantageous recirculation of the steam D thus acquired in the water-steam circuit 24 of the steam turbine unit 1b, the third evaporator heating surface 124 is connected on the outlet side via a steam line 126 to the moisture separator 50.

If necessary, as is indicated by the dotted line in FIGS. 1 to 3, the third evaporator heating surface 124 can also be series connected to another superheater heating surface 128. From this superheated steam provided by the superheater heating surface 128, the fresh steam flowing from the superheater 52 for the high-pressure component 20*a* of the steam turbine 20 can then be admixed via an overflow line 130.

On account of the design of the evaporator heating surfaces 120, 122, 124 as forced throughflow steam generators, the provision of relatively high-quality steam D for recirculation in the water-steam circuit 24 of the steam turbine unit 1*b* is possible. This means that the heat produced during cooling of the cooling air for gas turbine 2 can be recirculated particularly advantageously. Supply of the superheated steam D generated in the device 100 during cooling of the coolant for gas turbine 2 therefore takes place in the embodiment in the high-pressure stage or highest pressure stage of the water-steam circuit 24. Alternatively, however, supply to another pressure stage, in particular, to a medium-pressure stage, may be proposed in particular with regard to external, predetermined marginal conditions.

In order to facilitate reliable operation of the device 100 in the light-load range as well, the first evaporator heating surface 120 is designed in such a way that it can be bypassed if need be. To this end, a three-way valve 131, via which a bypass line 132 branches off from the supply line 112, is connected in series to the first evaporator heating surface 120 on the inlet side. On the outlet side, the bypass line 132 flows into an infeed point in the output area of the first evaporator heating surface 120, in particular into its penultimate intermediate collector. This ensures that in the light-load range as well, in which only a relatively small amount of flow medium can be made available, there is no evaporation at all in the first evaporator heating surface 120 and the incoming flow medium is therefore exclusively liquid without incorporated steam parts from the series-connected evaporator heating surface. If need be, that is to say, in particular in the light-load range, by means of appropriate switching of the three-way valve 131, the flow medium can therefore be largely directed past the majority of the heating surface pipes of the first evaporator heating surface 120 via the bypass line 132.

Figure 4:
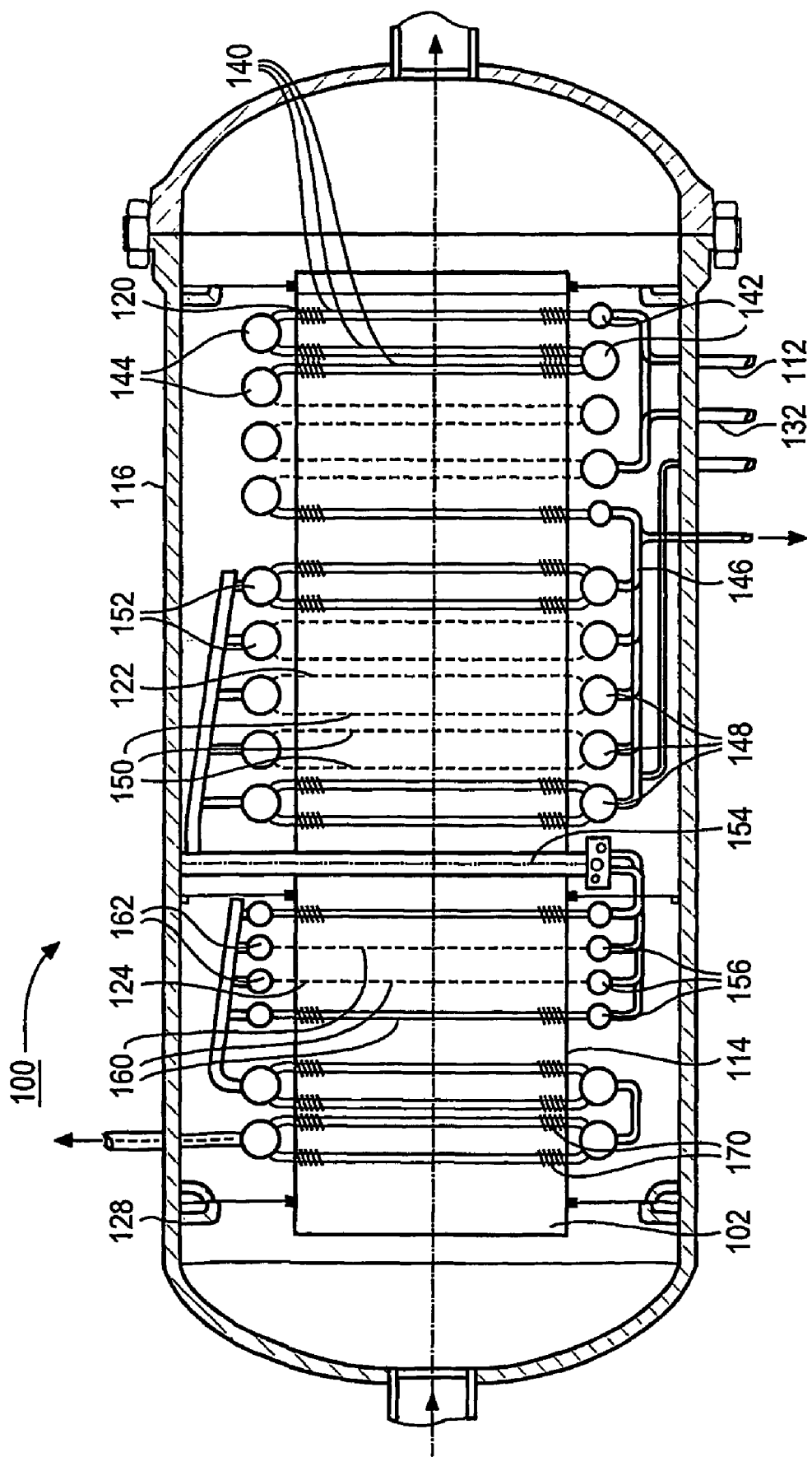
FIG. 4 shows a longitudinal section of the device for coolant cooling assigned to the gas turbine of the gas and steam turbine according to FIGS. 1 to 3, and FIG. 5 a cross-section of the device according to FIG. 4.
Figure 5:
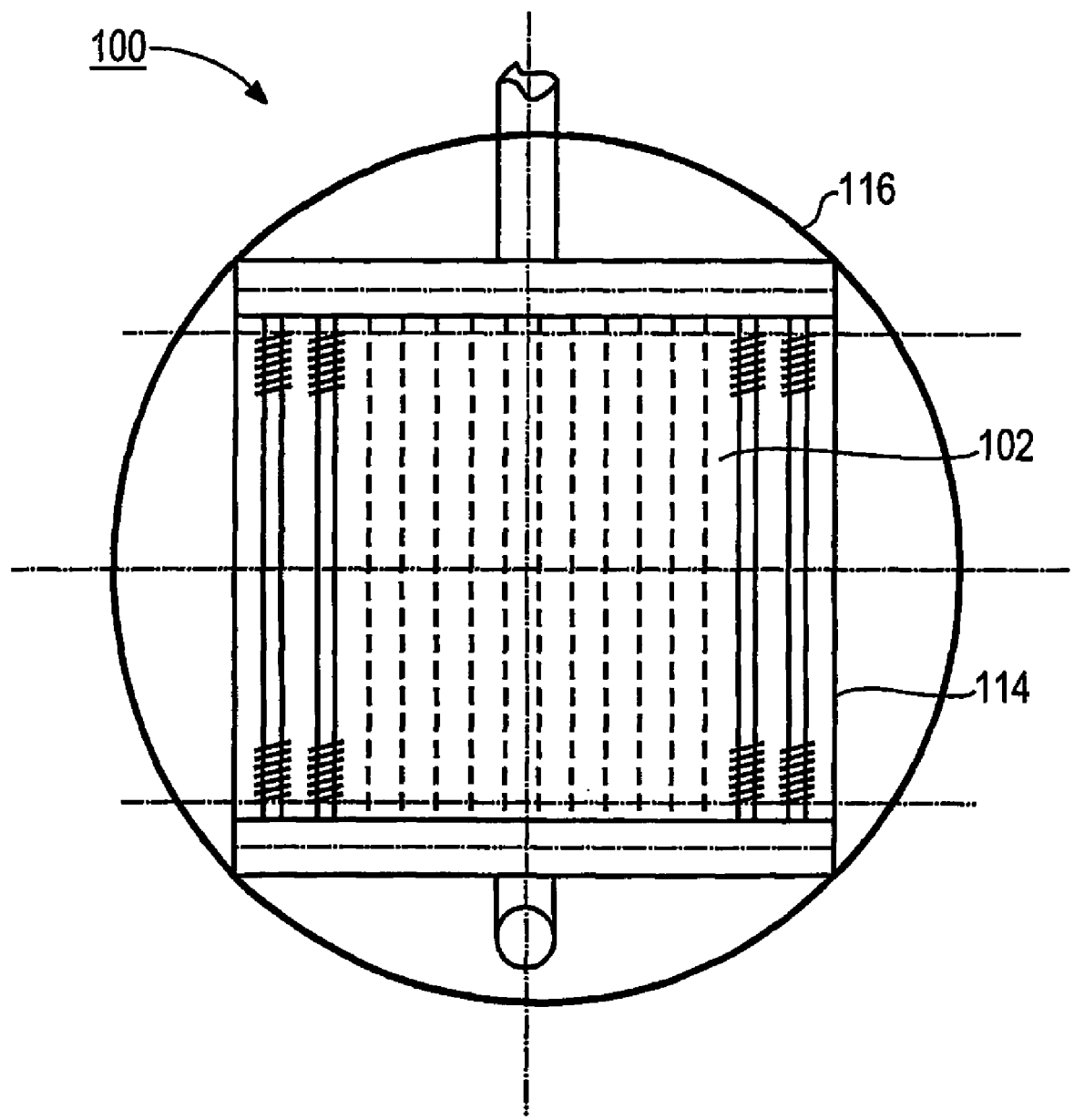

The precise construction of the device 100 for coolant cooling of the gas turbine 2 can be seen in a longitudinal section in FIG. 4 and in a cross-section in FIG. 5. As is evident there, the external housing of the device 100 comprises a relatively thick-walled pressure vessel 116, in which the internal housing 114 for the formation of the coolant channel 102 is arranged. The device 100 is designed in a horizontal style for an essentially horizontal coolant channel 102. In other words, the coolant channel 102 of the device 100 is designed for direct flow of the coolant for the gas turbine 2 in an essentially horizontal direction.

As is evident from FIG. 4 in particular, the first evaporator heating surface 120, the second evaporator heating surface 122, the third evaporator heating surface 124 and the superheater heating surface 128 are arranged in the coolant channel 102. The first evaporator heating surface 120 is designed as a preheater heating surface or economizer and is composed of a number of evaporator tubes 140 connected in parallel for the flow medium. The evaporator tubes 140, to which a number of appropriately positioned inlet collectors 142, also designated as inlet distributors, are connected upstream and a number of appropriately positioned outlet collectors 144 are connected downstream to form the first evaporator heating surface 120, are connected to the incoming line 112 on the inlet side. The outlet collectors 144 connected downstream to the evaporator tubes 140 are for their part connected to an overflow line 146 to which a number of the inlet collectors 148 from the second evaporator heating surface 122 are assigned. In addition, the inlet collectors 148 are connected on the inlet side to the bypass line 132 which is connected to the three-way valve 131 in the manner not shown in greater detail in FIG. 4.

A number of evaporator tubes 150 forming the second evaporator heating surface are connected upstream to the inlet collectors 148. The second evaporator heating surface 122 is designed as an actual evaporator heating surface in particular with regard to the dimensioning and positioning of the evaporator tubes 150 forming it. On the outlet side, the evaporator tubes 150 are connected to a number of outlet collectors 152 assigned to the second evaporator heating surface 122.

For their part, these outlet collectors 152 are connected on the outlet side via an overflow system 154 to a number of inlet collectors 156 assigned to the third evaporator heating surface 124. These are connected upstream to a number of evaporator tubes 160 forming the third evaporator heating surface 124. On the outlet side, these evaporator tubes 160 flow into a number of outlet collectors 162 assigned to the third evaporator heating surface 124. The third evaporator heating surface 124 is also designed as an actual evaporator heating surface.

The outlet collectors 162 assigned to the third evaporator heating surface 124 are connected on the outlet side to a number of evaporator tubes 170 forming the superheater heating surface 128.

The device 100 is therefore designed in the manner of a horizontally constructed throughflow steam generator. This "horizontal construction" in particular enables simple and robust operational performance of the device 100 with a high level of operational stability and only slight pressure losses on the flow medium side. In addition, precisely the horizontal construction enables simple installation of the device 100 without an expensive support framework on relatively simple continuous footings. The evaporator tubes 140, 150, 160, 170 series-connected on the flow-medium side to form the throughflow steam generator are each vertically aligned, that is to say, with their longitudinal axis in an essentially vertical direction. To ensure high heat transmission from the cooling air flowing through the coolant channel 102 to the flow medium flowing through the evaporator tubes 140, 150, 160, 170, in addition the evaporator tubes 140, 150, 160, 170 can each be provided with internal and/or external fins.

For particularly flexible coolant cooling of the gas turbine 2, adjusted to the respective operating status of the gas and steam turbine 1, 1', 1", the cooling capacity of the device 100 for coolant cooling of the gas turbine 2 is adjustable and adaptable to the respective operating status. To this end, the device 100 is assigned a control system 180 for selection of the throughflow rate of the flow medium through the device 100, as shown in FIGS. 1 to 3. The control system 180 is connected on the outlet side to the flow restrictor in the supply line 112 of the device 100 for transmission of a control command from the actuating signal S via a signal line 182. Via the control system 180, the valve positioning of the flow restrictor 110 and consequently the application of slow medium to the device 100 as a secondary coolant can be selected by inputting an appropriate control command or actuating signal S. On the inlet side, the control system 180 is connected via a first signal line 184 to a first temperature sensor 186 and via a second signal line 188 to a second temperature sensor 190. The first temperature sensor 186 is arranged in an area before the device 100 on the cooling air line 104. The second temperature sensor 190, on the other hand, is arranged in an area after the device 100 on the cooling air line 104. In this way, measured values for the temperature of the cooling air to be cooled for the gas turbine 2 can be supplied to the control system 180 before its entry into the device 100 and after its exit from the device 100. Furthermore, additional parameters such as desired temperature values or manually selected settings may be supplied to the control system 180, as indicated by the arrow 192.

The control system 180 can therefore establish a characteristic value for the cooling requirement on recooling of this cooling air on the basis of a variance comparison for the temperature of the cooling air to be cooled for the gas turbine 2. As a function of this characteristic value for the cooling requirement, an actuating signal S can then be output to the flow restrictor 110, via which a throughflow rate of flow medium through the device 100 adjusted to the cooling requirement on recooling of the cooling air can take place.

For a particularly flexible and in addition, precise selection of the cooling capacity in the device 100 on recooling of the cooling air for the gas turbine 2, a mixture of flow medium at various temperatures can additionally be applied to the device 100. To this end, the supply line 112 of the device 100 is connected to the feedwater train of the water-steam circuit 24 of the steam turbine unit 1b on the inlet side both at a place before a preheater and at a place after a preheater. In the embodiment according to FIG. 1, the supply line 112 is connected on one side at a place 200 after the feedwater pump 42 to the feedwater train of the water-steam circuit 24. The feedwater fed into the supply line 112 at the place 200 has therefore on the one hand run through the condensate preheater 38 and therefore displays a relatively high temperature. On the other hand, the feedwater at this place is also under relatively high pressure generated by the feedwater pump 42 with the result that the feedwater can be conveyed to the evaporator heating surfaces 120, 122 and 124 of the device 100 without additional means of increasing the pressure.

In addition, however, in the embodiment according to FIG. 1 the supply line 112 is also connected via a partial flow line 202 to the condensate line 35. Via the partial flow line 202, to which a condenser admixture pump 204 and a flow restrictor 206 are connected, condensate K removed at a place 208 before the condensate preheater 38, and therefore relatively cold, can be fed into the supply line 112. The pressure necessary to feed this condensate K into the supply line 112 is generated by the condenser admixture pump 204.

An actuating signal S can be applied to the flow restrictor 206 connected to the partial flow line 202 from the control system 180 via a signal line 210. Admixture of the relatively cold condensate K to the supply line 112, adjusted to the respective operational situation, in particular, depending on the cooling requirement, can therefore take place via the control system 180. In other words, the flow restrictor 110, 206 in the embodiment according to FIG. 1 shows means by which the throughflow rates of various partial flows of the flow medium intended to be applied to the device 100 can be selected. The control system 180 is assigned to these means in such a way that the incoming ratio of the partial flows is adjustable as a function of a characteristic value for a temperature value of the coolant of gas turbine 2 to be cooled, in particular, with regard to a comparison of this value with a desired value.

In the embodiment according to FIG. 2, that is to say in the gas and steam turbine 1', it is likewise envisaged that an adjustable mixture of condensate K removed before flowing through the condensate preheater 38 and after flowing through the condensate preheater 38 will be applied to the device 100. In the embodiment according to FIG. 2, however, the supply line 112 is connected on the inlet side of the supply line 40, that is to say, before entry of the condensate K into the feedwater pump 42.

In order to provide the necessary pressure for entry into the device 100 in the flow medium, a pressure boosting pump 212 is connected to the supply line 112 in the embodiment according to FIG. 2. For any necessary admixture of relatively cold condensate K to the partial flow of preheated condensate K branching off from the supply line 40 as flow medium for the device 100, a partial flow line 214 is also envisaged for the gas and steam turbine 1' according to FIG. 2. The partial flow line 214 is connected to the condensate line 35 on the inlet side and flows into the incoming line 112 on the outlet side at a place before the pressure booster pump 212. To select an admixture rate of cold condensate K into the supply line 112 which meets requirements, a flow restrictor 216 is connected to the partial flow line 214 to which a control variable S from the control system 180 can be applied via a signal line 218.

In the gas and steam turbine 1'' according to FIG. 3, feeding the device 100 with a selected mixture of unpreheated and preheated feedwater is envisaged. To this end, the supply line 112 branches off at a place 220 after the feedwater pump 42 from the feedwater train of the water-steam circuit 24. Thus, feedwater under high pressure, not yet preheated in the feedwater preheater 44 reaches the supply line 112 through the feedwater pump 42. For a relatively finely dosed temperature setting, a partial flow line 222 which branches off from the feedwater train of the water-steam circuit 24 at a place 224 after the feedwater preheater 44 is also envisaged in this embodiment. The partial flow line 222, to which a flow restrictor 226 is connected, flows into the supply line 112 on the outlet side so that preheated feedwater under high pressure can continue to be added to the supply line 112 via the partial flow line 222 in the feedwater preheater 44.

A control signal S can be applied to the flow restrictor 226 via a signal line 228 from the control system 180, so that in this embodiment as well the mixture ratio of the partial flows of relatively warm and relatively cold flow medium can be selected as required and in particular as a function of the measured temperature parameters of the cooling air to be cooled for the gas turbine 2.

The device 100, to which a mixture of partial flows of a flow medium of various temperatures adjusted to the actual cooling requirement can be applied in each of the three embodiments mentioned, is designed in the embodiments as a forced throughflow steam generator without a separator vessel connected between the evaporator heating surfaces 120, 122, 124, 128.

In this embodiment, starting the device 100 with unfilled (dry) or partially filled evaporator heating surfaces 120, 122, 124, 128 is envisaged. This is possible without a notable risk of overheating, in particular, with regard to the anticipated temperatures of the coolant to be cooled for the gas turbine 2 of up to approximately 500° C. precisely when using heat-resisting materials such as, for example, 13 Cro Mo 44 or 15 Mo 3 for the evaporator tubes 140, 150, 160, 170. Thus, with a relatively simple construction, the device 100 is already highly usable on start-up, while in particular, the risk of excessive cooling of the coolant for the gas turbine 2 during start-up is avoided.

The invention claimed is:

1. A device for cooling a coolant in a gas turbine, comprising:
a plurality of interconnected evaporator tubes arranged in a coolant channel connected to the gas turbine to accommodate a flow of the coolant and to provide a forced through-flow steam generator, whereby the coolant evaporates completely in the evaporator tubes in a single pass through the evaporator tubes and each of the evaporator tubes has internal fins and the coolant channel is designed for direct flow of the coolant for the gas turbine in an substantially horizontal direction, an longitudinal axis of the evaporator tubes substantially aligned in a vertical direction.

2. The device according to claim 1, wherein compressor air from the gas turbine is applied to the coolant channel.

3. The device according to one of claim 1, wherein the flow medium is applied to the evaporator tubes via a supply line preceding them on the inlet side, wherein mechanisms to select the throughflow rate of the flow medium are connected to the supply line.

4. The device according to claim 3, wherein the means of setting the throughflow rate of the flow medium include a flow restrictor connected to the supply line.

5. The device according to claim 2, wherein the flow medium is applied to the evaporator tubes via a supply line preceding them on the inlet side, wherein means to select the throughflow rate of the flow medium are connected to the supply line.

6. The device according to claim 1, wherein the forced throughflow steam generator functions by using heat produced while cooling the coolant to generate high quality steam.

7. A gas and steam turbine, comprising:
a device for a coolant cooling of a gas turbine, in which a number of interconnected evaporator tubes are arranged in a coolant channel connected to the gas turbine for a flow medium for a formation of a forced throughflow steam generator, whereby the flow medium is adapted to evaporate completely in the evaporator tubes in a single operation;
a waste heat steam generator connected to an exhaust gas side of the gas turbine, wherein the heating surfaces are connected to a water-steam circuit of the steam turbine; and
a supply line connecting the evaporator tubes on the inlet side to the feedwater train of the water-steam circuit of the steam turbine,
wherein the supply line is connected on the inlet side via a first partial flow line to a first partial component of the feedwater train preceding a feedwater preheater and via a second partial flow line to a second partial component of the feedwater train downstream of the feedwater preheater.

8. The gas and steam turbine according to claim 7, wherein the evaporator tubes of the device assigned to the gas turbine for coolant cooling are connected on the outlet side to a high-pressure stage of the water-steam circuit.

9. The gas and steam turbine according to claim 7, wherein in each of the first and second partial flow lines, mechanisms of setting the throughflow rate of the respective partial flow are connected to flow medium to which a control system is assigned, via which the flow ratio of the partial flows is adjustable in the partial flow lines as a function of a characteristic value for a temperature value of the coolant to be cooled.

10. A device for cooling a coolant in a gas turbine, comprising:
a plurality of interconnected evaporator tubes arranged in a coolant channel connected to the gas turbine to accommodate a flow of the coolant and to provide a forced through-flow steam generator, whereby the coolant evaporates completely in the evaporator tubes in a single pass through the evaporator tubes and at least some of the evaporator tubes have internal fins and the coolant channel is designed for direct flow of the coolant for the gas turbine in an substantially horizontal direction, an longitudinal axis of the evaporator tubes substantially aligned in a vertical direction.

* * * * *